(12) United States Patent
Huang et al.

(10) Patent No.: US 11,929,513 B2
(45) Date of Patent: Mar. 12, 2024

(54) FUEL CELLS, BIFUNCTIONAL CATALYSTS THEREOF, AND PREPARATION METHODS THEREFOR

(71) Applicant: HARBIN INSTITUTE OF TECHNOLOGY, SHENZHEN, Shenzhen (CN)

(72) Inventors: Yan Huang, Shenzhen (CN); Jinbo Fei, Shenzhen (CN); Jiaqi Wang, Shenzhen (CN)

(73) Assignee: HARBIN INSTITUTE OF TECHNOLOGY, SHENZHEN, Shenzhen (CN)

( * ) Notice: Subject to any disclaimer, the term of this patent is extended or adjusted under 35 U.S.C. 154(b) by 228 days.

(21) Appl. No.: 17/573,654

(22) Filed: Jan. 12, 2022

(65) Prior Publication Data
US 2022/0344675 A1 Oct. 27, 2022

(30) Foreign Application Priority Data
Apr. 27, 2021 (CN) .......................... 202110462553.9

(51) Int. Cl.
| | |
|---|---|
| H01M 4/92 | (2006.01) |
| C08F 120/06 | (2006.01) |
| H01M 4/88 | (2006.01) |
| H01M 4/90 | (2006.01) |
| H01M 8/10 | (2016.01) |
| H01M 8/1072 | (2016.01) |

(52) U.S. Cl.
CPC .......... *H01M 4/928* (2013.01); *C08F 120/06* (2013.01); *H01M 4/8825* (2013.01); *H01M 4/9091* (2013.01); *H01M 8/1072* (2013.01); *C08F 2438/02* (2013.01); *H01M 2008/1095* (2013.01); *H01M 2300/0082* (2013.01)

(58) Field of Classification Search
CPC .. H01M 4/928; H01M 4/8825; H01M 4/9091; H01M 8/1072; H01M 2300/0082; H01M 4/921; H01M 4/926; C08F 120/06; C08F 2438/02
See application file for complete search history.

(56) References Cited

U.S. PATENT DOCUMENTS

2016/0013494 A1* 1/2016 Arihara ............... C23C 18/1637
429/524

* cited by examiner

*Primary Examiner* — Stewart A Fraser (57) ABSTRACT

A bifunctional catalyst and a preparation method therefor are provided. The bifunctional catalyst is prepared by providing carbon matrix, adding 0.01-10 mol/L platinum containing solution, 0.01-10 mol/L palladium containing solution, 0.01-10 mol/L silver containing solution, and 0.01-15 mol/L sodium citrate trihydrate solution to the carbon matrix for reacting at 20° C. to 80° C. for 0.5 h to 24 h to obtain a mixed solution, and adding reducing agent to the mixed solution for reacting for 0.5 h to 30 h, and centrifuging and drying so as to obtain the bifunctional catalyst.

9 Claims, 9 Drawing Sheets

FUEL CELLS, BIFUNCTIONAL CATALYSTS THEREOF, AND PREPARATION METHODS THEREFOR

TECHNICAL FIELD

The present invention relates to the technical field of batteries, in particular to bifunctional catalysts and preparation methods thereof, and fuel cells and preparation methods thereof.

BACKGROUND

With limited energy reserves, the total energy consumption globally exceeds 370 EJ every year, i.e., the total energy consumption globally exceeds 170 million barrels of oil per day, of which about 95% comes from fossil fuels which are known as typical non-renewable energy resources, which means the possibility of a global energy crisis. Therefore, it is quite necessary to develop alternative renewable energy sources. Reliable, low-cost and environmentally-friendly energy storage systems (such as super-capacitors, batteries, etc.) and energy conversion systems (such as fuel cells, solar cells, etc.) have become hot topics in recent years, among which, fuel cells are particularly promising because of their high energy density. Fuel cell is a device that directly converts the chemical energy of fuel into usable electricity and heat through electrochemical reaction, which operates in a similar manner to a battery, but does not require charging and would not be exhausted. It has the advantages of high energy conversion efficiency irrespective of load, little pollution, easy operation and saving labor, and promotes the energy innovation and breakthrough in the 21st century. The commonly used liquid fuels, such as methanol, ethanol and urea, are easy to transport, widely available and low in cost. In spite of great efforts made in recent years to make light and small fuel cells, these devices are still far from practical applications due to several serious problems, such as difficulty in fuel storage, fuel crossover, etc.

Among all types of fuel cells, direct ethanol fuel cell (DAFC) has not only the advantages mentioned above, but also the advantages of being non-toxic, friendly to human beings, various green power generations, etc, which is considered to be one of the best candidates for flexible and wearable electronic devices. Therefore, it is strategically important to develop direct ethanol fuel cell for large-scale energy conversion applications. The known DAFCs usually use Pt as anode catalyst. However, Pt has low electronically catalytic activity for fuels of alcohols and small organic molecules, and is also easily poisoned by oxidized intermediates. Furthermore, Pt is high in cost. Therefore, there is a need to develop high performance electro catalysts.

SUMMARY

In view of the above, the present invention aims to provide a bifunctional catalyst and a preparation method thereof which can solve the above problems, and a fuel cell including the bifunctional catalyst and a preparation method thereof.

To this end, in one aspect, the present invention provides a method for the preparation of a bifunctional catalyst. The preparation method includes (S1) providing carbon matrix; (S2) adding 0.01-10 mol/L platinum containing solution, 0.01-10 mol/L palladium containing solution, 0.01-10 mol/L silver containing solution, and 0.01-15 mol/L sodium citrate trihydrate solution to the carbon matrix for reacting at 20° C. to 80° C. for 0.5 h to 24 h to obtain a mixed solution; and (S3) adding reducing agent to the mixed solution for reacting for 0.5 h to 30 h, and centrifuging and drying to obtain the bifunctional catalyst.

In some embodiments, the step (S1) comprises steps of (S1.1) mixing carbon black with 1% to 20% of acid at 80° C. for 1 h to 5 h, washing and filtering with deionized water for several times to obtain carbon black powder; and (S1.2) adding the carbon black powder to dispersant, and completely dispersing the carbon black powder by ultrasonic treatment to obtain the carbon matrix.

In some embodiments, the acid is at least one selected from a group consisting of nitric acid, hydrochloric acid, sulfuric acid and acetic acid; and/or the dispersant is at least one selected from a group consisting of ethanol, ethylene glycol, glycerol, acetone and citric acid.

In some embodiments, the carbon black powder has a particle diameter ranging from 20 nm to 200 μm.

In some embodiments, the platinum containing solution is chloroplatinic acid solution, the palladium containing solution is chloropalladium acid solution, and/or the silver containing solution is silver nitrate solution.

In some embodiments, the reducing agent is at least one selected from a group consisting of bromine water, potassium permanganate, nitric acid and sodium borohydride.

In some embodiments, the bifunctional catalyst comprises palladium with particle diameter ranging from 0.1 nm to 50 nm, platinum with particle diameter ranging from 0.1 nm to 50 nm, and silver with particle diameter ranging from 0.1 nm to 50 nm.

In another aspect, the present invention also provides a bifunctional catalyst which is obtained according to the aforementioned preparation method.

In still another aspect, the present invention also provides a preparation method of a fuel cell. The preparation method comprises the following steps: preparing an anode by coating bifunctional catalyst on a first current collector, wherein the bifunctional catalyst is prepared according to the aforementioned preparation method; preparing a cathode by coating N,S codoped carbon catalyst on a second current collector; preparing electrolyte by polymerizing sodium acrylate and zinc acrylate with initiator to obtain hydrogel, and soaking the hydrogel in strong alkali solution; and preparing the fuel cell by sandwiching the electrolyte between the cathode and the anode.

In a further aspect, the present invention also provides a fuel cell, which is obtained according to the aforementioned method.

The present invention provides a bifunctional catalyst which is capable of catalyzing both the oxidation of ethanol and the reduction of acetaldehyde and is prepared by a simple liquid reduction method, being a ternary alloy catalyst which is prepared by composing several noble metal elements (Pt, Pd, Ag) with carbon substrate. The PtPdAg/C ternary alloy catalyst has excellent ability to catalyze ethanol oxidation and acetaldehyde reduction, good long-term stability, and excellent operation in fuel cells. It contributes to the high open-circuit voltage of the fuel cell and has a wide application prospect.

DESCRIPTION OF THE EMBODIMENTS

In the following, the present invention will be described in detail with reference to the accompany drawings and specific embodiments, so that the technical solutions of the present invention and its beneficial effects can be more clearly understood. It is to be understood that the drawings are for reference and illustration only and are not intended to limit the invention, and that the dimensions shown in the drawings are only for clarity of description and are not intended to limit the proportionality.

Embodiment 1

Preparation of Bifunctional Catalyst

Figure 1A:
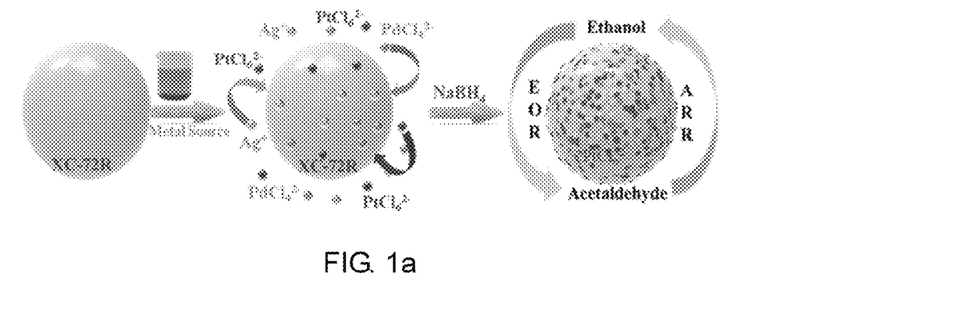
FIG. 1*a* is a schematic view of the preparation of a PtPdAg/C catalyst according to the first embodiment of the present invention.

Referring to FIG. 1a, in this embodiment, bifunctional catalyst of PtPdAg/C ternary alloy was synthesized through method of liquid reduction. Specifically, 100 mg of CABOT carbon black (XC-72R, available from Alfa Aesar) was mixed with 1%-20% of an acid solution at 80° C. and stirred for 1-5 h (2 h in this embodiment). The acid solution is selected from at least one of the groups consisting of nitric acid, hydrochloric acid, sulfuric acid, and acetic acid, and in this embodiment, 60 ml of 5% hydrochloric acid is selected. In other embodiments, other acid solutions can be selected. For embodiment, a mixed solution of nitric acid and sulfuric acid, wherein the volume ratio of nitric acid to sulfuric acid is 1:5 to 5:1. Then, the mixed solution is washed and filtered with deionized water for several times, and dried at 60° C. for 6 h to obtain carbon black powder. The carbon black powder serves as a substrate for the catalyst and has a large active surface area, and the pore diameter thereof is preferably in the range of 20 nm to 200 μm, more preferably in the range of 20 nm to 100 μm, and is 10 μm in this embodiment. The carbon black powder can increase the long-term stability of the catalyst. Thereafter, 1-50 mg of carbon black powder was added into 10-100 ml of dispersion solution, and was completely dispersed by ultrasonic treatment. In this embodiment, 4 mg of carbon black powder was added to the dispersion solution, and was uniformly dispersed by ultrasonic treatment to obtain a carbon matrix. The dispersion solution can be at least one selected from the group consisting of ethanol, ethylene glycol, glycerin, acetone, and citric acid solutions. In this embodiment, the dispersion solution is 50 ml of ethanol solution.

The carbon matrix was added with 0.1-20 ml of 0.01-10 mol/L (preferably 0.02-9 mol/L) platinum containing solution, 0.1-20 ml of 0.01-10 mol/L (preferably 0.02-9 mol/L) palladium containing solution, 0.1-20 ml of 0.01-10 mol/L (preferably 0.02-9 mol/L) (preferably 0.02-9.5 mol/L) silver containing solution and 0.1-20 ml of 0.01-15 mol/L sodium citrate trihydrate solution, and reacted at 20-80° C. for 0.5-24 h to obtain a mixed solution. In this embodiment, 1.5 ml of 1 mol/L chloroplatinic acid solution, 1 ml of 1.5 mol/L chloropalladium acid solution, 1.7 ml of 1.3 mol/L silver nitrate solution, and 5 ml of 0.8 mol/L sodium citrate trihydrate solution were added into the carbon matrix, and uniformly stirred and reacted for 0.5 h at 80° C. to obtain a mixed solution. It is to be understood that in other embodiments, other solutions containing platinum, palladium, and silver can be used, and the concentrations of the solutions can vary appropriately.

Finally, 1-90 mg of reducing agent was dissolved in 1-200 ml of water and added to the mixed solution, reacting for 0.5-30 h, centrifuging and drying to obtain the bifunctional catalyst. The reducing agent can be selected from at least one of the group consisting of bromine water, potassium permanganate, nitric acid, and sodium borohydride. In this embodiment, 10 mg of sodium borohydride ($NaBH_4$) was dissolved in 20 ml of water, slowly dropped into the mixed solution, fully reacted for 2 h, centrifuged, and dried at 60° C. for 6 h to obtain the bifunctional catalyst of PtPdAg/C ternary alloy. The particle diameter of palladium atoms of the obtained bifunctional catalyst of PtPdAg/C ternary alloy preferably ranges from 0.1 nm to 50 nm, the particle diameter of platinum atoms preferably ranges from 0.1 nm to 50 nm, and the particle diameter of silver atoms preferably ranges from 0.1 nm to 50 nm.

Preparation of Electrolyte

Sodium acrylate and zinc acrylate are polymerized through initiator, and the hydrogel product obtained by the polymerization is soaked in a strong alkali solution to obtain electrolyte.

Figure 1B:
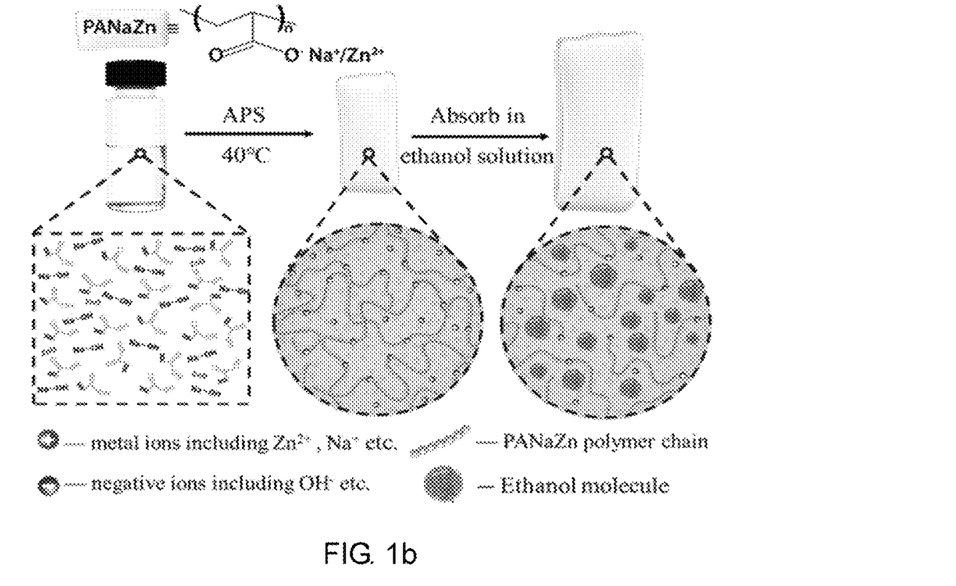
FIG. 1b is a schematic view of the preparation of an electrolyte according to the first embodiment of the present invention.

Referring to FIG. 1b, specifically, in this embodiment, first, 44 g of acrylic acid (AA) was dissolved in 54 g of deionized water in an ice bath and sufficiently stirred to obtain acrylic acid solution. At the same time, 26.584 g of sodium hydroxide was completely dissolved in 25 g of deionized water to obtain sodium hydroxide solution. The sodium hydroxide solution was slowly dropped into the acrylic acid solution in an ice bath with continuous stirring, and then 0.1185 g of zinc oxide was slowly added therein in the ice bath with continuous stirring. Finally, 0.78 g of ammonium persulfate (APS) was added therein in an oven at 40±3° C. to initiate free radical polymerization and stably reacted for 30 hours, thereby obtaining PANaZn hydrogel. The PANaZn hydrogel was dried in an oven at 110° C. for 65 minutes, and was soaked in 6 M of KOH and 5 M of ethanol solution to obtain the electrolyte.

Preparation of Fuel Cell

Figure 1C:
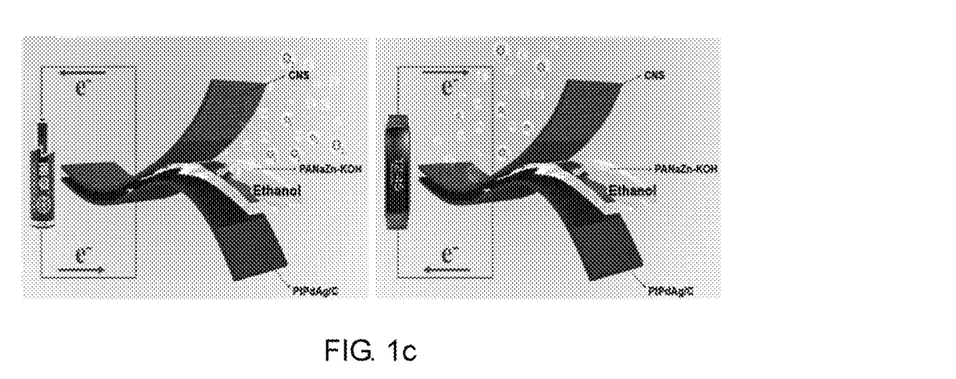
FIG. 1c is a schematic view of the preparation of a fuel cell according to the first embodiment of the present invention.

Referring to FIG. 1c, 5 mg of PtPdAg/C catalyst was added to a solution of 1 mL of isopropanol and 15 μL of 5 wt % Nafion (perfluorosulfonic acid ion exchange resin) solution to obtain PtPdAg/C catalyst ink, 10 mg of CNS catalyst (N,S codoped carbon catalyst) was added to a solution including 0.1 mL of 5 wt % Nafion solution, 0.72 mL of deionized water and 0.18 mL of isopropanol to obtain CNS catalyst ink. Then, the PtPdAg/C catalyst ink and the CNS catalyst ink were dropped onto respective current collectors such as 1 cm * 5 cm breathable carbon cloth to obtain an anode and a cathode. In this embodiment, the carbon cloth was coated with 0.5 mg of CNS and 1 mg of PtPdAg/C catalyst per square meter ($m^2$). The aforementioned electrolyte with PANaZn hydrogel was then sandwiched between the cathode and the anode under air conditions, thereby obtaining an ethanol fuel cell having a sandwich structure of carbon cloth (CNS catalyst) -PANaZn-carbon cloth (PtPdAg/C catalyst). The resulted cell is rechargeable and flexible.

Optionally, the CNS catalyst can be prepared by using the following method including steps of mixing silica powder, sucrose and trithiocyanuric acid, preheating the silica powder, the sucrose and the trithiocyanuric acid to obtain a mixed powder, mixing the mixed powder with poly tetra fluoroethylene, and heating the mixed powder with poly tetra fluoroethylene to obtain N,S codoped carbon catalyst. In this embodiment, the silica powder, the sucrose and the trithiocyanuric acid have the same mass, and the silica powder is preferably fumed silica having a particle diameter of 200 nm. Preferably, the silica powder, the sucrose and the trithiocyanuric acid are first dispersed into deionized water, followed by addition of 96-97 wt. % $H_2SO_4$ and full mixture, wherein the weight of the $H_2SO_4$ is 3% of the total weight of the silica powder, the sucrose and the trithiocyanuric acid, and then sonicating for about 10 min to get a mixed solution. The mixed solution is preheated to get said mixed powder. In this embodiment, the preheated step includes the following sub-steps: the mixed solution is first heated up to 100° C. for liquid evaporation until it turns into solid, the resulted solid is then further heated at 160° C. for the polymerization of the sucrose and cross-linking of the trithiocyanuric acid monomers to get said mixed powder. In this embodiment, the obtained mixed powder is first finely ground and uniformly mixed with an excess amount of poly tetra fluoroethylene powder to get a mixture which is then subjected to be calcinated at 600° C. for 1 h and further at 1100° C. for 3 h under inert atmosphere with a ramp rate of 5° C./min so as to get the N,S codoped carbon catalyst powder. Preferably, the particle size of the poly tetra fluoroethylene is 5 μm, and the ratio of the weight of the poly tetra fluoroethylene to the weight of the fumed silica powder is no less than 10.

Figure 2A:
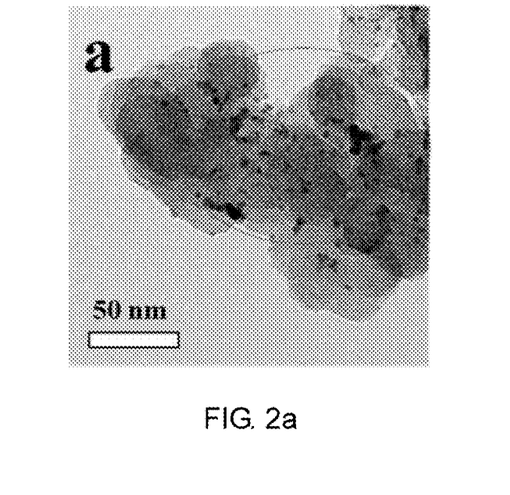
FIG. 2a shows a TEM image of the PtPdAg/C catalyst prepared according to the first embodiment.
Figure 2B:
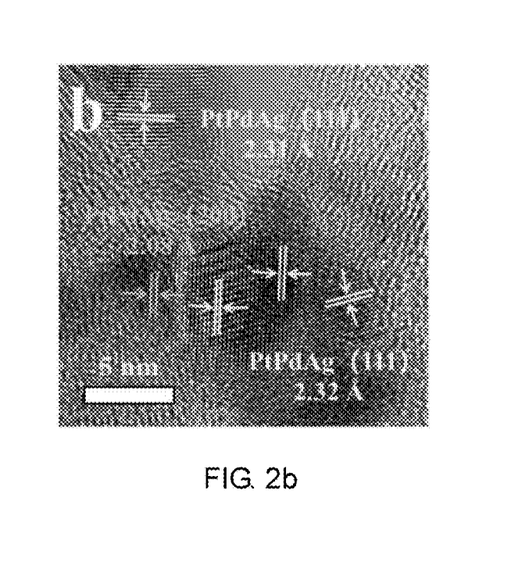
FIG. 2b shows a HRTEM image of the PtPdAg/C catalyst prepared according to the first embodiment.
Figure 2C:
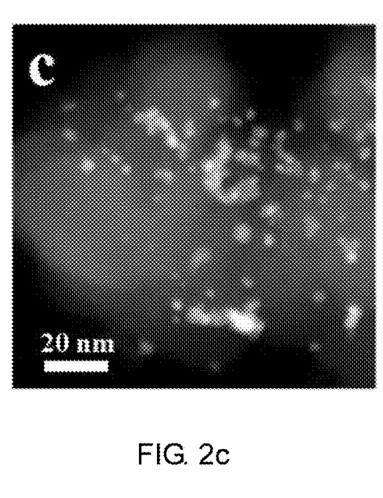
FIG. 2c shows an EDS mapping of elements within the PtPdAg/C catalyst prepared according to the first embodiment.
Figure 2D:
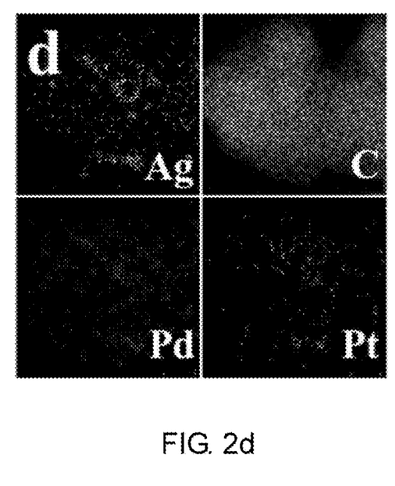
FIG. 2d shows another EDS mapping of elements within the PtPdAg/C catalyst prepared according to the first embodiment.

FIG. 2a shows a TEM image of the PtPdAg/C, and FIG. 2b shows a HRTEM image of the PtPdAg/C catalyst prepared according to the first embodiment, and FIGS. 2c and 2d show EDS mappings of elements within the PtPdAg/C catalyst prepared according to the first embodiment. As shown in these figures, the metal particles Pt, Pd, Ag are uniformly dispersed on the surface of the carbon substrate with less agglomeration, which is beneficial to increase the surface area exposed by metal nanoparticles, thus effectively enhancing catalytic activity.

Embodiment 2

The second embodiment is substantially the same as the first embodiment except the preparation conditions for the bifunctional catalyst are different.

In particular, carbon black powder was added into 70 ml of glycerol solution, and mixed uniformly; and 10 mg of 60% nitric acid dissolved in 50 ml of water was dropped into the mixed solution to obtain the bifunctional catalyst of PtPdAg/C ternary alloy.

The results of electrochemical performance test showed that the PtPdAg/C catalyst prepared according to the second embodiment has a size of 0.1-60 nm for the metal particle, excellent catalytic performance for ethanol oxidation and acetaldehyde reduction, and a CV curve therefor displayed high current density. The ethanol fuel cell with PtPdAg/C as anode catalyst has an initial open circuit voltage about 0.87 V, and a stable open circuit voltage about 0.58 V, with an excellent discharge performance.

Embodiment 3

The third embodiment is substantially the same as the first embodiment except the preparation conditions for the bifunctional catalyst are different.

Specifically, in this embodiment, 3 ml of 1 mol/L chloropalladium acid solution was selected, instead of 1 ml of 1.5 mol/L chloropalladium acid solution.

The results of electrochemical performance test showed that the PtPdAg/C catalyst prepared according to the third embodiment has a size of 0.1-50 nm for the metal particle, excellent catalytic performance for ethanol oxidation and acetaldehyde reduction, and a CV curve therefor displayed high current density. The ethanol fuel cell with PtPdAg/C as anode catalyst has an initial open circuit voltage about 0.85 V, and a stable open circuit voltage about 0.62 V.

Embodiment 4

The fourth embodiment is substantially the same as the first embodiment except the preparation conditions for the bifunctional catalyst are different.

Specifically, the bifunctional catalyst for PtPdAg/C ternary alloy was synthesized through method of liquid reduction. Specifically, 100 mg of CABOT carbon black was mixed with 10 ml of 20% nitric acid at 80° C., stirred and reacted for 2 h, washed and filtered with deionized water for several times, and dried at 80° C. overnight to obtain carbon black powder. The carbon black powder has a large active surface area, and its pore diameter is about 10 μm. 16 mg of carbon black powder was added into 20 ml of ethylene glycol solution and was subject to an ultrasonic treatment for 20 min to obtain carbon matrix.

778 μL of 0.01 mol/L chloroplatinic acid solution, 2.334 ml of 0.01 mol/L chloropalladium acid solution, 3.89 ml of 0.01 mol/L silver nitrate aqueous solution, and 2 ml of 0.1 mol/L sodium citrate trihydrate solution were added into the above carbon matrix in order, stirred uniformly, and reacted for 0.5 h at 80° C. to obtain a mixed solution.

Finally, 15 mg of bromine water was dissolved in 20 ml of water, slowly dropped into the mixed solution, fully reacted for 2 h, filtered, washed with ethanol, and dried at 80° C. overnight to obtain the bifunctional catalyst of PtPdAg/C ternary alloy.

Controlled Experiment 1

In the controlled experiment, Pt/C catalyst was synthesized by liquid reduction. 100 mg of carbon black and 60 ml of hydrochloric acid were mixed, stirred for reaction for 2 h, filtered, and dried at 60° C. for 6 h to obtain carbon black powder. The carbon black powder has a large active surface area, and its pore diameter is about 10 μm. 4 mg of carbon black powder was added into 50 ml of ethanol solution, subjected to an ultrasonic treatment to get carbon matrix. 1 ml of 1.5 mol/L chloroplatinic acid solution and 5 ml of 0.8 mol/L sodium citrate solution were added into the above carbon matrix, and stirred uniformly to obtain a mixed solution. Finally, 10 mg of bromine water was dissolved in 20 ml of water, slowly dropped into the mixed solution, fully reacted for 2 h, centrifuged, and dried at 60° C. for 6 h to obtain Pt/C catalyst.

The electrochemical performances for the Pt/C catalyst for ethanol oxidation and acetaldehyde reduction were tested, and the results showed that the performances for the Pt/C catalyst were much lower than those for the PtPdAg/C catalyst.

Figure 3A:
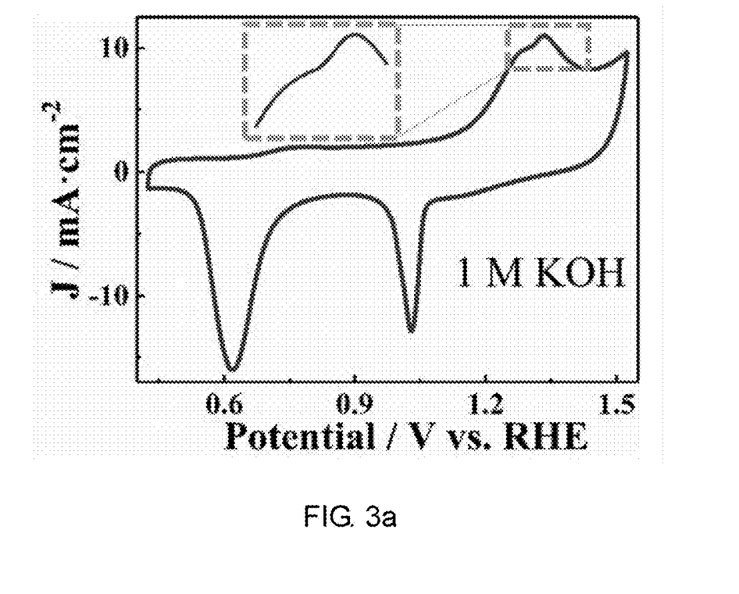
FIG. 3a shows a CV curve of PtPdAg/C catalyst prepared according to the first embodiment in $N_2$-saturated 1 M KOH solution at a scan rate of 50 mV $s^{-1}$.
Figure 3B:
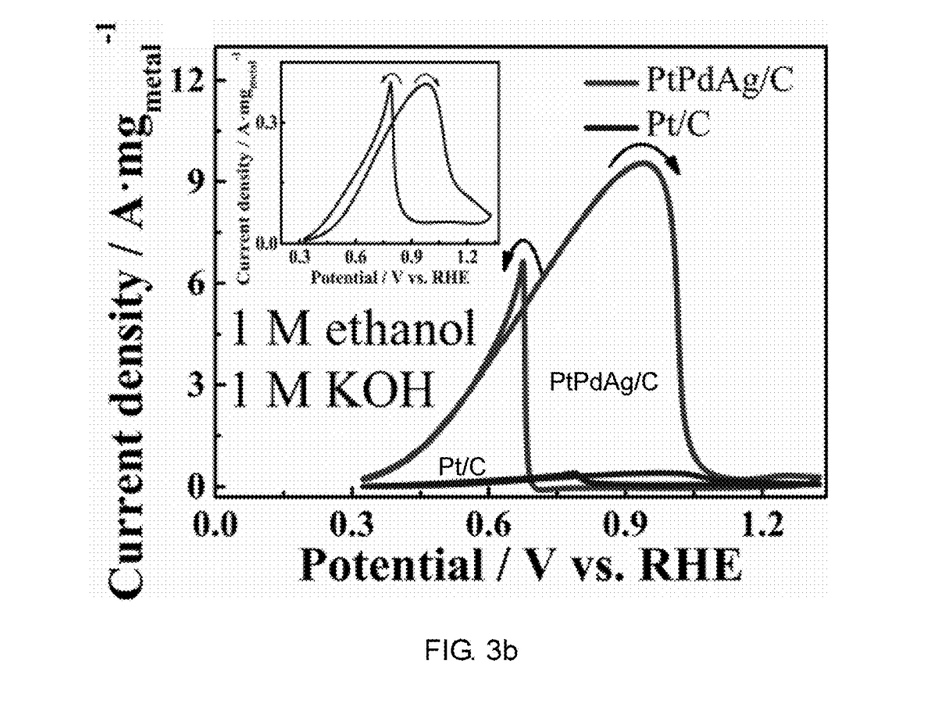
FIG. 3b shows CV curves of PtPdAg/C catalyst prepared according to the first embodiment and Pt/C catalyst prepared according to the controlled experiment 1 in $N_2$-saturated 1 M ethanol+1 M KOH solution at a scan rate of 50 mV $s^{-1}$.
Figure 3C:
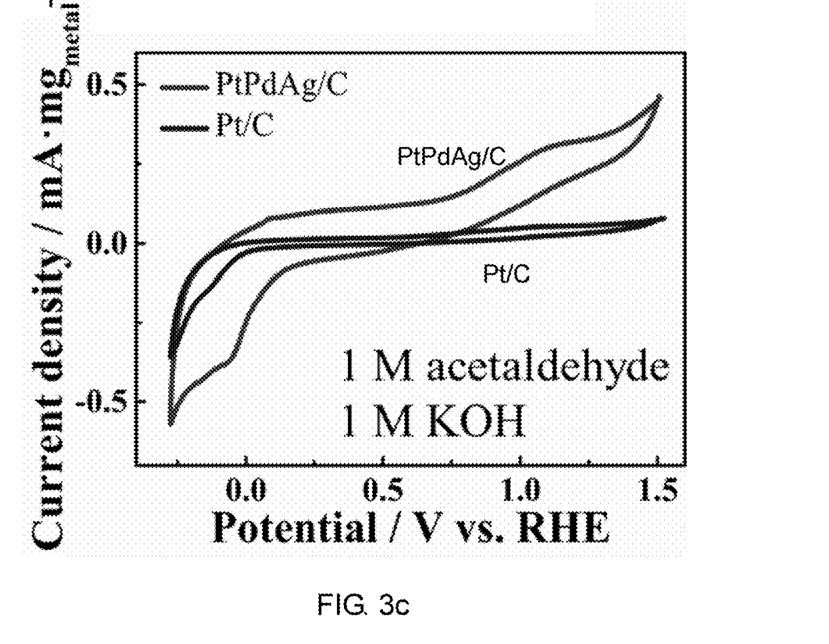
FIG. 3c shows CV curves of PtPdAg/C catalyst prepared according to the first embodiment and Pt/C catalyst prepared according to the controlled experiment 1 in $N_2$-saturated 1 M acetaldehyde+1 M KOH solution at a scan rate of 50 mV $s^{-1}$.
Figure 3D:
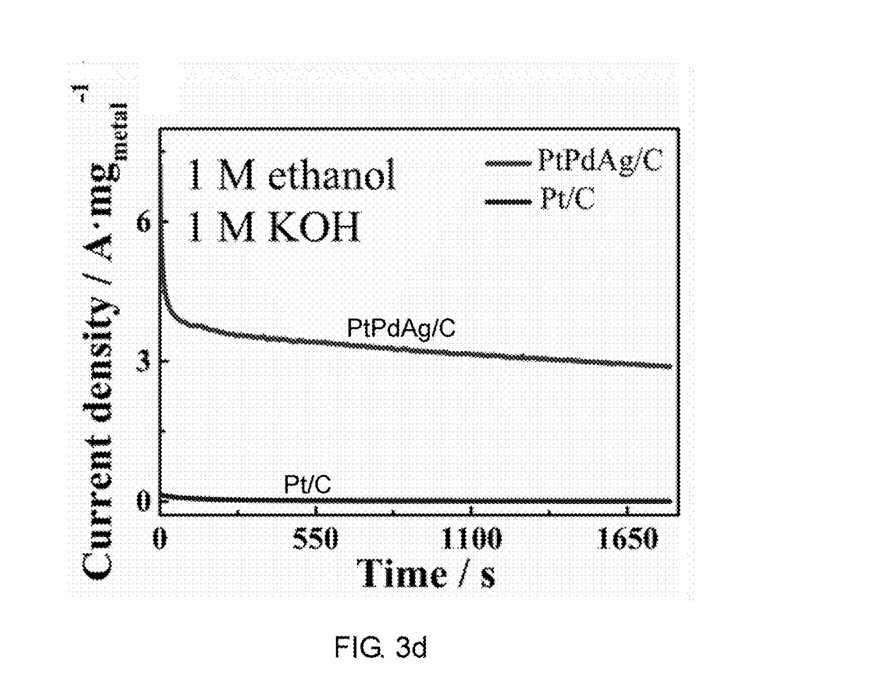
FIG. 3d shows chronoamperometric measurements of PtPdAg/C prepared catalyst according to the first embodiment and Pt/C catalyst prepared according to the controlled experiment 1 at 0.72 V vs. RHE in $N_2$-saturated 1 M ethanol+1 M KOH solution.
Figure 3E:
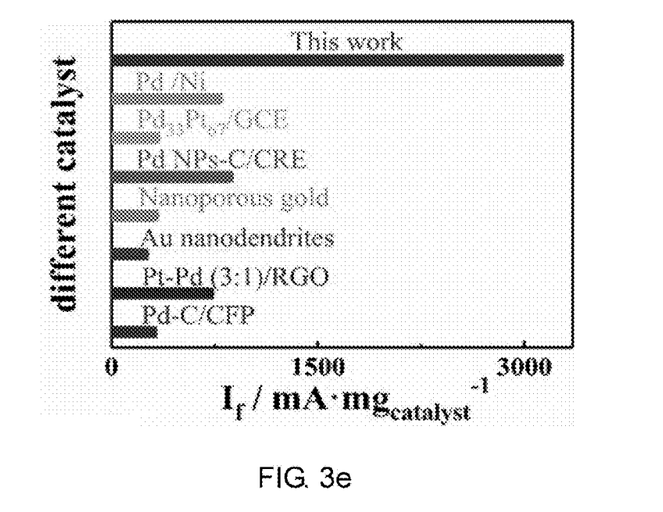
FIG. 3e shows $I_f$ of PtPdAg/C catalyst prepared according to the first embodiment compared with some known catalysts.
Figure 3F:
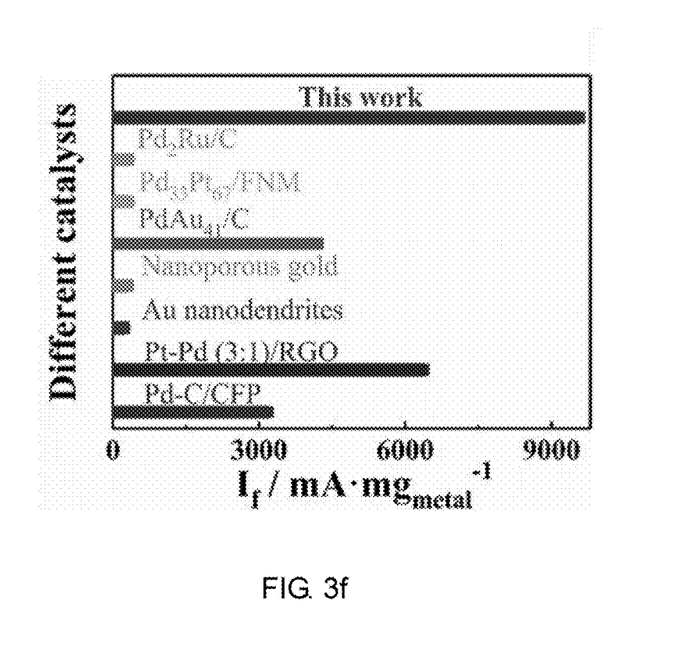
FIG. 3f shows $I_f$ of PtPdAg/C catalyst prepared according to the first embodiment compared with some other known catalysts.

Specifically, FIG. 3a shows a CV curve of PtPdAg/C catalyst prepared according to the first embodiment in $N_2$-saturated 1 M KOH solution at a scan rate of 50 mV $s^{-1}$. FIG. 3b shows CV curves of PtPdAg/C catalyst prepared according to the first embodiment and Pt/C catalyst prepared according to the controlled experiment 1 in $N_2$-saturated 1 M ethanol+1 M KOH solution at a scan rate of 50 mV $s^{-1}$. FIG. 3c shows CV curves of PtPdAg/C catalyst prepared according to the first embodiment and Pt/C catalyst prepared according to the controlled experiment 1 in $N_2$-saturated 1 M acetaldehyde+1 M KOH solution at a scan rate of 50 mV $s^{-1}$, which shows that the PtPdAg/C catalyst prepared according to the first embodiment has a good cycling performance and a high current density. FIG. 3d shows chronoamperometric measurements of PtPdAg/C prepared catalyst according to the first embodiment and Pt/C catalyst prepared according to the controlled experiment 1 at 0.72 V vs. RHE in $N_2$-saturated 1 M ethanol+1 M KOH solution, and it can be seen that the PtPdAg/C catalyst prepared according to the first embodiment exhibits excellent long-term stability. FIGS. 3e and 3f show $I_f$ of PtPdAg/C catalyst prepared according to the first embodiment compared with some known catalysts, and it can be seen that the PtPdAg/C catalyst prepared according to the first embodiment delivers strong high $I_f$ (3238 mA $mg_{catalyst}^{-1}$). These high catalytic performances are attributed to the increased surface area exposed by metal nanoparticles as well as the charge transferred from Pt to the additional Pd in the ternary alloy, which contributes to preventing the adsorption of toxic intermediates on the surface of alloy during the reaction.

Figure 4A:
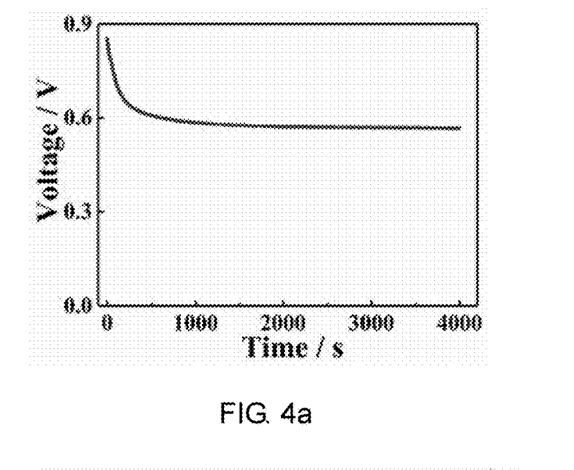
FIG. 4a is an OCV curve of the fuel cell prepared according to the first embodiment.
Figure 4B:
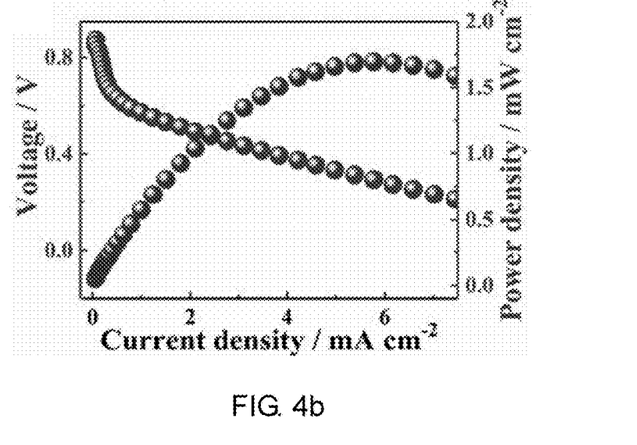
FIG. 4b is polarization curve of the fuel cell prepared according to the first embodiment and corresponding power densities calculated.
Figure 4C:
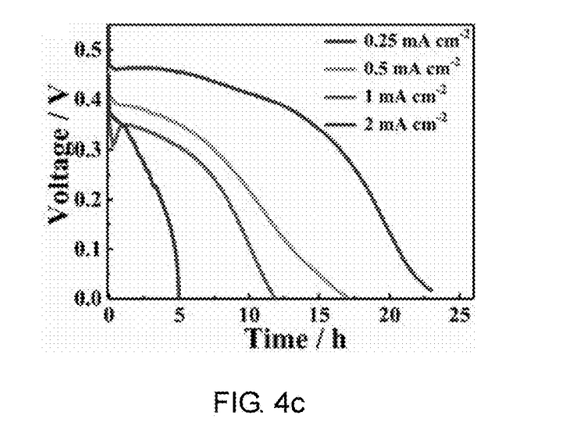
FIG. 4c shows discharging profiles of the fuel cell prepared according to the first embodiment at various current densities from 0.25 mA $cm^{-2}$ to 2 mA $cm^{-2}$.
Figure 4D:
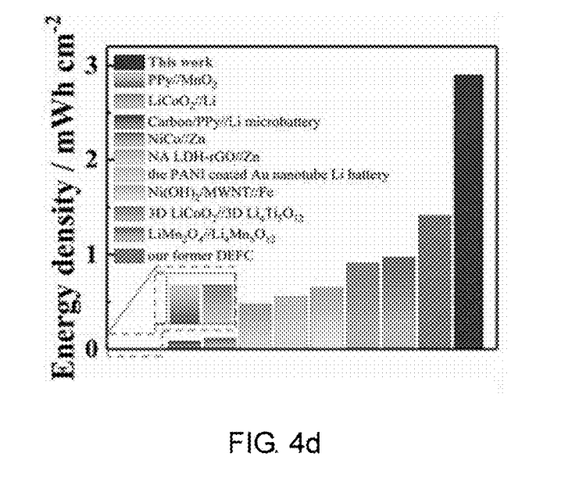
FIG. 4d shows a comparison of the energy density between the fuel cell prepared according to the first embodiment and various known fuel cells.
Figure 4E:
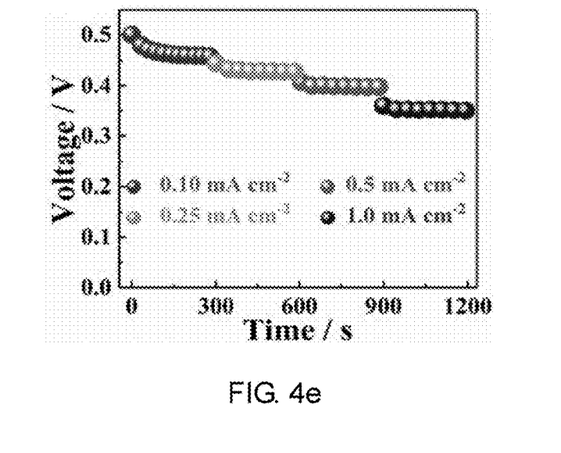
FIG. 4e shows rate performance of the fuel cell prepared according to the first embodiment at various current densities from 0.1 mA $cm^{-2}$ to 1 mA $cm^{-2}$.
Figure 4F:
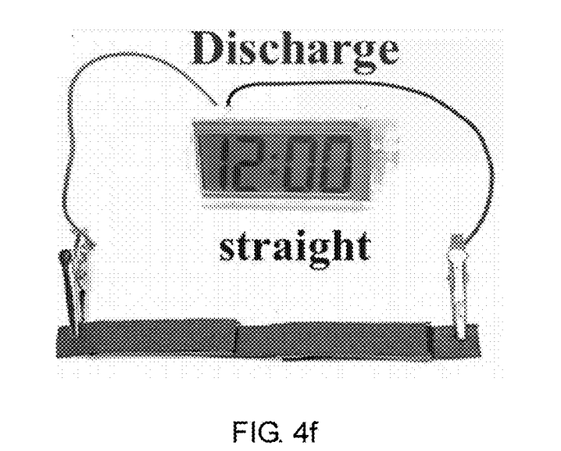
FIG. 4f shows straight two-in-series ethanol fuel cell prepared according to the first embodiment powers an electronic clock very well.
Figure 4G:
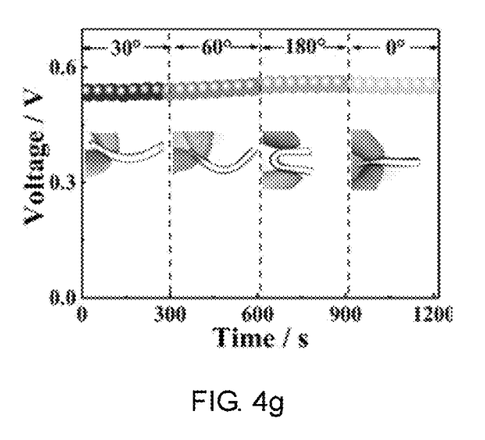
FIG. 4g shows discharge voltage of the fuel cell prepared according to the first embodiment under consecutive bending from 0° to 180°.
Figure 4H:
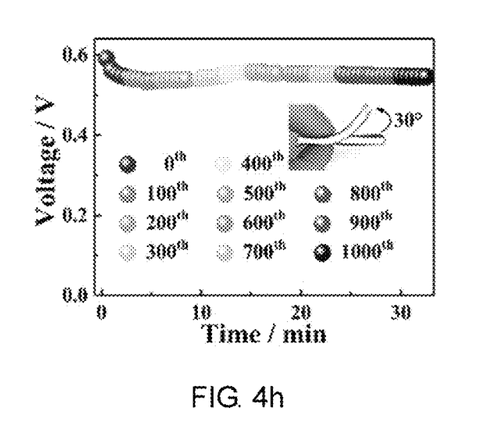
FIG. 4h shows discharge voltage of the fuel cell prepared according to the first embodiment under various times of bending.
Figure 4I:
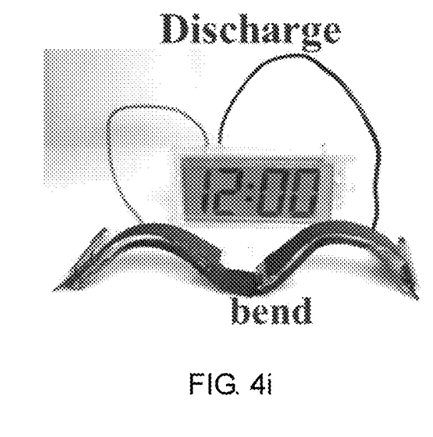
FIG. 4i shows the flexible two-in-series ethanol fuel cell prepared according to the first embodiment powers an electronic clock very well.

FIG. 4a is an OCV curve of the fuel cell prepared according to the first embodiment, showing that the fuel cell prepared according to the first embodiment has an initial open circuit voltage of about 0.9 V and a stable open circuit voltage of about 0.6 V, with excellent discharge performance. FIG. 4b is polarization curve of the fuel cell prepared according to the first embodiment and corresponding power densities calculated, and it can be concluded that the maximum output power density of the fuel cell prepared according to the first embodiment was 1.7 mW/cm². FIG. 4c shows discharging profiles of the fuel cell prepared according to the first embodiment at various current densities from 0.25 to 2 mA $cm^{-2}$, and it can be seen that when discharged at a current density of 0.25 mA $cm^{-2}$, the discharge time can be up to about 23.6 h, which proves that the fuel cell prepared according to the first embodiment has a good discharge capability. FIG. 4d shows a comparison of the energy density between the fuel cell prepared according to the first embodiment and various known fuel cells, and it can be seen that the fuel cell prepared according to the first embodiment provides a maximum areal energy density of 2.9 mWh/cm², which is unavailable in the known fuel cells. FIG. 4e shows rate performance of the fuel cell prepared according to the first embodiment at various current densities from 0.1 to 1 mA cm⁻2, and it can be seen that the discharge voltage of the fuel cell prepared according to the first embodiment keeps high and stable when the current density increases multiply. FIG. 4f shows straight two-in-series ethanol fuel cell prepared according to the first embodiment powers an electronic clock very well. FIG. 4g shows discharge voltage of the fuel cell prepared according to the first embodiment under consecutive bending from 0° to 180°, and it can be seen that the fuel cell prepared according to the first embodiment can be bent maximally to 180°, and when bent sequentially to 30°, 60°, 180° and finally back to 0°, a stable discharge voltage is still maintained. FIG. 4h shows discharge voltage of the fuel cell prepared according to the first embodiment under various times of bending, in which the fuel cell is bent 100 times per 180 s with the bending angle of 30°, and the total bending number was 1100. During the whole process, the discharge voltage remained stable at a high level. FIG. 4i shows the flexible two-in-series ethanol fuel cell prepared according to the first embodiment powers an electronic clock very well. All these results powerfully demonstrate that the fuel cell prepared according to the first embodiment performs excellently and stably under both straight and bent conditions, which is very promising in future applications.

The rechargeable and flexible ethanol fuel cells according to the embodiments of the invention by applying bifunctional catalysts for both ethanol oxidation reaction (EOR) and acetaldehyde reduction reaction (ARR) (capable of oxidizing ethanol to acetaldehyde and reducing acetaldehyde to ethanol), and a bifunctional hydrogel as fuel storeroom and anion exchange membrane (AEM). The PtPdAg/C ternary alloy with bifunctional catalytic property exhibits extraordinarily higher If (3238 mA mg$_{catalyst-1}$) in EOR and much lower overpotential in ARR test than Pt/C catalyst. In addition, the sodium zinc polyacrylate (PANaZn) hydrogel has the excellent ability to store ethanol up to 66.5 g$_{ethanol}$/g$_{PANaZn}$, and acetaldehyde up to 10.723 g$_{acetaldehyde}$/g$_{PANaZn}$. Benefiting from the introduction of $Zn^{2+}$, the PANaZn hydrogel with crosslinked network are able to allows ethanol and acetaldehyde molecules to enter the network. Moreover, benefiting from the introduction of KOH, the hydrogel exhibits high ionic conductivity around 0.16 S/cm, guaranteeing its utilization as a good AEM. As a result, the fuel cells show a highly rechargeable performance of more than 100 cycles (1000 minutes). And the fuel cells well maintain the voltage and easily power an electronic clock/are charged by a direct-current (DC) power under bending arbitrarily from 0° to 180°, suggesting an excellent flexibility. Furthermore, it exhibits merits of high performance (long discharge time of 23.6 h and outstanding rate performance), facile assembly and fewest components. Such high-performance truly rechargeable and flexible ethanol fuel cell opens up a new generation of functional fuel cells for flexible electronics.

The above descriptions are only preferred embodiments of the present invention, and the scope of protection of the present invention is not limited to the embodiments described above. Variations or equivalent substitutions which can be obtained obviously the skilled person in the art fall within the scope of protection of the present invention.

What is claimed is:

1. A preparation method of a bifunctional catalyst, comprising steps of:
   (S1) providing a carbon matrix;
   (S2) adding 0.01-10 mol/L platinum containing solution, 0.01-10 mol/L palladium containing solution, 0.01-10 mol/L silver containing solution, and 0.01-15 mol/L sodium citrate trihydrate solution to the carbon matrix for reacting at 20° C. to 80° C. for 0.5 h to 24 h to obtain a mixed solution; and
   (S3) adding a reducing agent to the mixed solution for reacting for 0.5 h to 30 h, and centrifuging and drying for 6 h to obtain the bifunctional catalyst.

2. The preparation method according to claim 1, wherein step (S1) comprises steps of:
   (S1.1) mixing carbon black with 1% to 20% of acid at 80° C. for 1 h to 5 h, washing and filtering with deionized water for several times to obtain carbon black powder; and
   (S1.2) adding the carbon black powder to a dispersant, and completely dispersing the carbon black powder by ultrasonic treatment to obtain the carbon matrix.

3. The preparation method according to claim 2, wherein the acid is at least one selected from a group consisting of nitric acid, hydrochloric acid, sulfuric acid and acetic acid; and/or the dispersant is at least one selected from a group consisting of ethanol, ethylene glycol, glycerol, acetone and citric acid.

4. The preparation method according to claim 2, wherein the carbon black powder has a particle diameter ranging from 20 nm to 200 μm.

5. The preparation method according to claim 1, wherein the platinum containing solution is chloroplatinic acid solution, the palladium containing solution is chloropalladium acid solution, and/or the silver containing solution is silver nitrate solution.

6. The preparation method according to claim 1, wherein the reducing agent is at least one selected from a group consisting of bromine water, potassium permanganate, nitric acid and sodium borohydride.

7. The preparation method according to claim 1, wherein the bifunctional catalyst comprises palladium with a particle diameter ranging from 0.1 nm to 50 nm, platinum with a particle diameter ranging from 0.1 nm to 50 nm, and silver with a particle diameter ranging from 0.1 nm to 50 nm.

8. A bifunctional catalyst, which is prepared by a method comprising steps of:
   (S1) providing a carbon matrix;
   (S2) adding 0.01-10 mol/L platinum containing solution, 0.01-10 mol/L palladium containing solution, 0.01-10 mol/L silver containing solution, and 0.01-15 mol/L sodium citrate trihydrate solution to the carbon matrix for reacting at 20° C. to 80° C. for 0.5 h to 24 h to obtain a mixed solution; and
   (S3) adding a reducing agent to the mixed solution for reacting for 0.5 h to 30 h, and centrifuging and drying for 6 h to obtain the bifunctional catalyst.

9. A preparation method of a fuel cell, comprising steps of:
   preparing an anode by coating bifunctional catalyst on a first current collector, wherein the bifunctional catalyst is prepared by a method comprising steps of:
   (S1) providing a carbon matrix,
   (S2) adding 0.01-10 mol/L platinum containing solution, 0.01-10 mol/L palladium containing solution, 0.01-10 mol/L silver containing solution, and 0.01-15 mol/L sodium citrate trihydrate solution to the carbon matrix for reacting at 20° C. to 80° C. for 0.5 h to 24 h to obtain a mixed solution, and
   (S3) adding a reducing agent to the mixed solution for reacting for 0.5 h to 30 h, and centrifuging and drying for 6 h to obtain the bifunctional catalyst;
   preparing a cathode by coating N,S codoped carbon catalyst on a second current collector;
   preparing an electrolyte by polymerizing sodium acrylate and zinc acrylate with an initiator to obtain a hydrogel and soaking the hydrogel in a potassium hydroxide solution; and
   preparing the fuel cell by sandwiching the electrolyte between the cathode and the anode.

* * * * *